(12) United States Patent
Parker

(10) Patent No.: US 11,407,349 B2
(45) Date of Patent: Aug. 9, 2022

(54) BUS OCCUPANCY CHECK SAFETY APPARATUS KIT

(71) Applicant: Gregory Charles Parker, Rex, GA (US)

(72) Inventor: Gregory Charles Parker, Rex, GA (US)

( * ) Notice: Subject to any disclaimer, the term of this patent is extended or adjusted under 35 U.S.C. 154(b) by 965 days.

(21) Appl. No.: 16/155,156

(22) Filed: Oct. 9, 2018

(65) Prior Publication Data
US 2020/0108758 A1    Apr. 9, 2020

(51) Int. Cl.
*B60N 2/90* (2018.01)
*B60N 2/24* (2006.01)

(52) U.S. Cl.
CPC ............... *B60N 2/90* (2018.02); *B60N 2/242* (2013.01)

(58) Field of Classification Search
CPC .................................. B60N 2/90; B60N 2/242
See application file for complete search history.

(56) References Cited

U.S. PATENT DOCUMENTS

| | | |
|---|---|---|
| 5,128,651 A | 7/1992 | Heckart |
| 5,243,323 A | 9/1993 | Rogers |
| 5,874,891 A | 2/1999 | Lowe |
| 6,107,915 A | 8/2000 | Reavell |
| 6,667,686 B2 * | 12/2003 | Talbot ...................... B60Q 9/00 340/433 |
| 7,378,946 B2 | 5/2008 | Lahr |
| 7,646,288 B2 | 1/2010 | Wiley |
| 10,013,592 B2 * | 7/2018 | McQuade ........ G06K 19/06187 |
| 10,780,825 B1 * | 9/2020 | Nathan ..................... B60Q 9/00 |
| 2002/0079734 A1 * | 6/2002 | Murphy .................. B60R 22/26 297/483 |
| 2003/0014166 A1 * | 1/2003 | Chinigo ............ B60R 21/01512 340/433 |
| 2003/0030550 A1 | 2/2003 | Talbot |
| 2005/0062595 A1 * | 3/2005 | Hofbeck ................. B60R 22/48 340/457.1 |

\* cited by examiner

*Primary Examiner* — Anthony D Barfield

(57) ABSTRACT

A bus occupancy check safety apparatus kit for confirming seats are not occupied includes a seat occupancy cover belt system comprising a rear mount configured to be coupled to a rear of a bus. A belt has a back end coupled to the rear mount and a front end coupled to a male buckle. A front mount is coupled to a front of the bus and to a female buckle that is selectively engageable with the male buckle. The belt is drawn across a plurality of seats within the bus to engage the male buckle with the female buckle. A seat occupancy window indicator comprises a suction cup, a pull nub, and a sign having a lettered side displaying a message.

11 Claims, 4 Drawing Sheets

BUS OCCUPANCY CHECK SAFETY APPARATUS KIT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FHJNG SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to bus safety devices and more particularly pertains to a new bus safety device for confirming seats are not occupied.

BRIEF SUMMARY OF THE INVENTION

An embodiment of the disclosure meets the needs presented above by generally comprising a seat occupancy cover belt system comprising a rear mount having a bottom side, a top side, and an internal cavity. The top side has a belt aperture extending through to the internal cavity and the bottom side is configured to be coupled to a rear of a bus or a van. A belt has a back end coupled within the internal cavity of the rear mount and a front end extending through the belt aperture. The belt may be a bright green or yellow color. A male buckle is coupled to the front end of the belt. A front mount has a lower side and an upper side with the lower side configured to be coupled to a front of the bus or the van. A female buckle is coupled to the upper side of the front mount and is selectively engageable with the male buckle. The belt is configured to be drawn across a seatback top of a plurality of seats within the bus or the van to engage the male buckle with the female buckle. A seat occupancy window indicator comprises a suction cup having a window side and a back side. The suction cup is configured to be selectively engageable with a windshield of the bus or the van. A pull nub is centrally disposed on the back side of the suction cup and a sign is coupled to the pull nub. The sign has a lettered side displaying a message to the driver.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
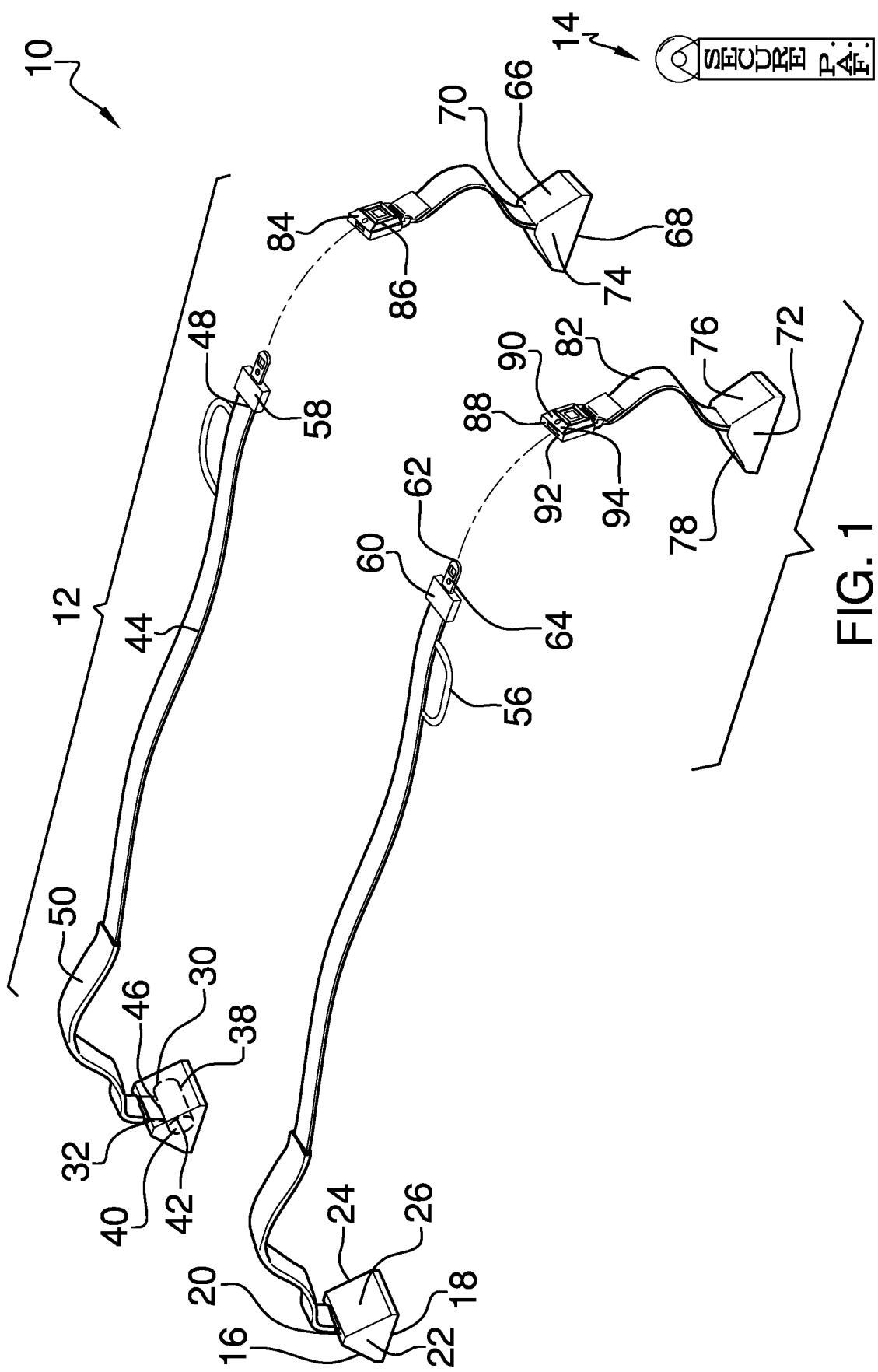
FIG. 1 is an isometric view of a bus occupancy check safety apparatus kit according to an embodiment of the disclosure.
Figure 2:
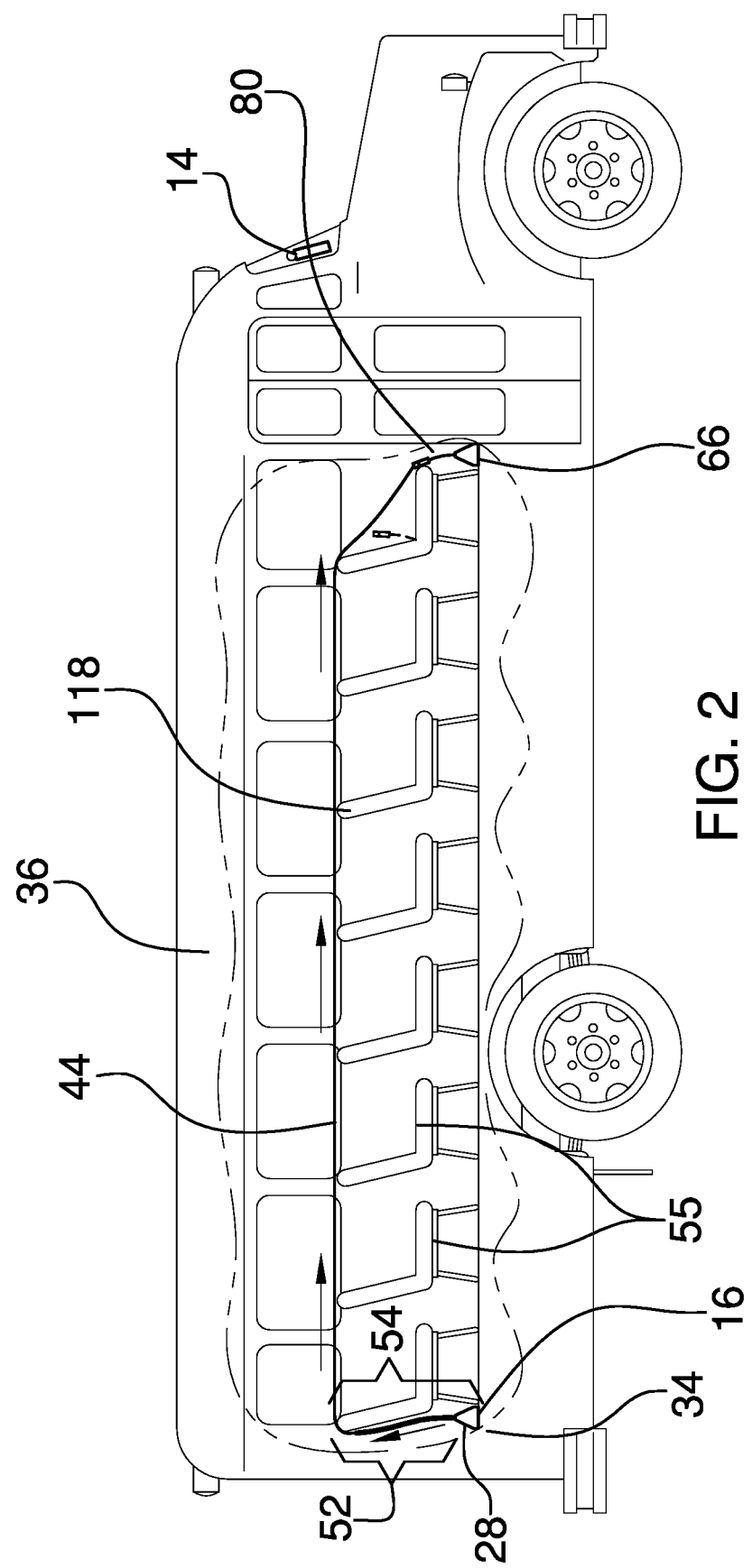
FIG. 2 is an in-use side elevation view of an embodiment of the disclosure.
Figure 3:
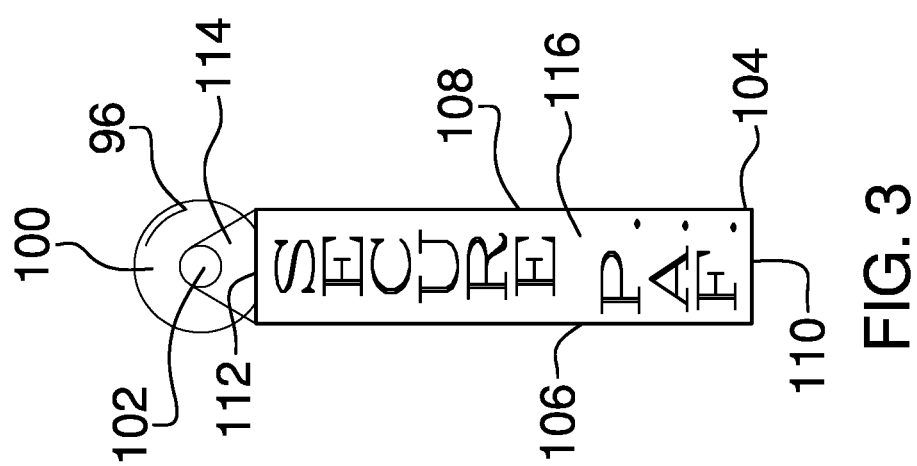
FIG. 3 is a detail view of an embodiment of the disclosure.
Figure 4:
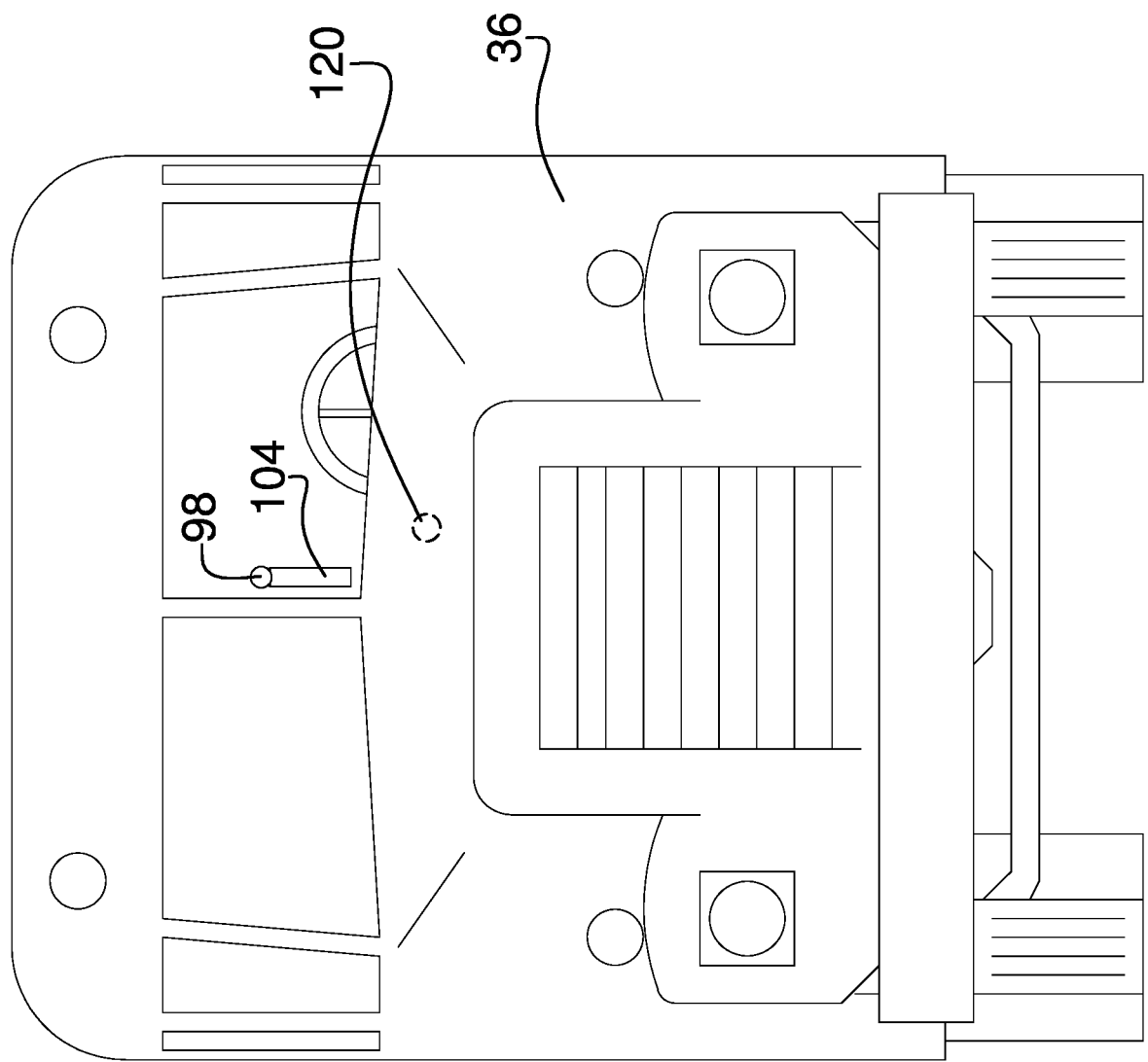
FIG. 4 is an in-use front elevation view of an embodiment of the disclosure.

With reference now to the drawings, and in particular to FIGS. 1 through 4 thereof, a new bus safety device embodying the principles and concepts of an embodiment of the disclosure and generally designated by the reference numeral 10 will be described.

As best illustrated in FIGS. 1 through 4, the bus occupancy check safety apparatus kit 10 generally comprises a pair of seat occupancy cover belt systems 12 and a seat occupancy window indicator 14. Each of the seat occupancy cover belt systems 12 comprises a rear mount 16 having a bottom side 18, a top side 20, a first triangular lateral side 22, a first triangular medial side 24, a first angled front side 26, a first angled rear side 28, and an internal cavity 30. The top side 20 has a belt aperture 32 extending through to the internal cavity 30 and the bottom side 18 is configured to be coupled to a rear 34 of a bus or a van 36. A retraction mechanism 38 may be coupled to the rear mount 16 and comprises a spool 40 coupled within the inner cavity 30 and a spring 42 coupled within the spool 40. A belt 44 has a back end 46 coupled to the spool 40 and a front end 48 extending through the belt aperture 32. The belt 44 winds and alternatively unwinds around the spool 40. A belt sheath 50 may be coupled around the belt aperture 32 and extends upwards around the belt 44. The belt sheath 50 has a length 52 that is configured to be less than a height 54 of a plurality of seats 55 of the bus or the van 36. A handle 56 may be coupled to the belt 44 proximal the front end 48 of the belt to provide a gripping point for the belt 44 to be drawn from the rear mount 16. A male buckle 58 is coupled to the belt 44. The male buckle 58 may comprise a buckle head 60 and a tongue 62 with the buckle head 60 coupled to the front end 48 of the belt and the tongue 62 coupled to the buckle head 60. The tongue 62 has a first lock aperture 64.

A front mount 66 has a lower side 68, an upper side 70, a second triangular lateral side 72, a second triangular medial side 74, a second angled front side 76, and a second angled rear side 78. The lower side 68 is configured to be coupled to a front 80 of the bus or the van 36. A buckle extension 82 may be coupled to the upper side 70 of the front mount. A female buckle 84 is coupled to the buckle extension 82 and selectively engages the male buckle 58. The female buckle 84 may comprise a buckle body 86 having a leading face 88 and an adjacent upper face 90. The leading face 88 has a receiver channel 92 and the upper face 90 has a second lock aperture 94 extending through the receiver channel 92. The receiver channel 92 selectively receives the tongue 62 of the male buckle with the first lock aperture 64 and the second lock aperture 94 being aligned when the male buckle 58 and the female buckle 84 are engaged. The first lock aperture 64 and the second lock aperture 94 are configured to receive a lock to prevent the male buckle 58 and the female buckle 84 from being disengaged.

The seat occupancy window indicator 14 comprises a suction cup 96 having a window side 98 and a back side 100. The suction cup 96 is configured to be selectively engageable with a windshield 101 of the bus or the van 36. A pull nub 102 is centrally disposed on the back side 100 of the suction cup. A sign 104 is coupled to the pull nub 102. The sign 104 may have a left edge 106, a right edge 108, a lower edge 110, an upper edge 112, a hang string 114, and a lettered side 116. The hang string 114 is coupled to the upper edge 112 adjacent the left edge 106 and extends around the pull nub 102 to the upper edge 112 adjacent the right edge 108. The lettered side 116 displays a message to the driver.

In use, the belt 44 is drawn from the rear mount 16 across a seatback top 118 of the plurality of seats 55 within the bus or the van to engage the male buckle 58 with the female buckle 84. The process is repeated for a second aisle of seats. This ensures the driver checks that each seat is unoccupied to prevent leaving a child or elderly person in the bus. The bus occupancy check safety apparatus kit may include a single seat occupancy cover belt system 12 for a van with a single aisle of seats to be checked. The seat occupancy window indicator 14 is placed on the windshield 101 near an ignition 120 of the bus to remind the driver to perform the check.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bus occupancy check safety apparatus kit comprising:
   a seat occupancy cover belt system comprising:
      a rear mount having a bottom side, a top side, and an internal cavity, the top side having a belt aperture extending through to the internal cavity, the bottom side being configured to be coupled to a rear of a bus or a van;
      a belt coupled to the rear mount, the belt having a back end coupled within the internal cavity of the rear mount and a front end extending through the belt aperture;
      a male buckle coupled to the belt, the male buckle being coupled to the front end of the belt;
      a front mount having a lower side and an upper side, the lower side being configured to be coupled to a front of the bus or the van; and
      a female buckle coupled to the front mount, the female buckle being coupled to the upper side of the front mount, the female buckle being selectively engageable with the male buckle;
      wherein the belt is configured to be drawn across a seatback top of a plurality of seats within the bus or the van to engage the male buckle with the female buckle; and
   a seat occupancy window indicator comprising:
      a suction cup having a window side and a back side, the suction cup being configured to be selectively engageable with a windshield of the bus or the van;
      a pull nub disposed on the suction cup, the pull nub being centrally disposed on the back side of the suction cup; and
      a sign coupled to the pull nub, the sign having a lettered side displaying a message through the windshield.

2. A bus occupancy check safety apparatus kit comprising:
   a pair of seat occupancy cover belt systems, each of the systems comprising:
      a rear mount having a bottom side, a top side, and an internal cavity, the top side having a belt aperture extending through to the internal cavity, the bottom side being configured to be coupled to a rear of a bus or a van;
      a belt coupled to the rear mount, the belt having a back end coupled within the internal cavity of the rear mount and a front end extending through the belt aperture;
      a male buckle coupled to the belt, the male buckle being coupled to the front end of the belt;
      a front mount having a lower side and an upper side, the lower side being configured to be coupled to a front of the bus or the van; and
      a female buckle coupled to the front mount, the female buckle being coupled to the upper side of the front mount, the female buckle being selectively engageable with the male buckle;
      wherein the belt is configured to be drawn across a seatback top of a plurality of seats within the bus or the van to engage the male buckle with the female buckle; and
   a seat occupancy window indicator comprising:
      a suction cup having a window side and a back side, the suction cup being configured to be selectively engageable with a windshield of the bus or the van;

a pull nub disposed on the suction cup, the pull nub being centrally disposed on the back side of the suction cup; and a sign coupled to the pull nub, the sign having a lettered side displaying a message through the windshield.

3. The bus occupancy check safety apparatus kit of claim 1 further comprising a retraction mechanism coupled to the rear mount, the retraction mechanism comprising a spool coupled within the inner cavity and a spring coupled within the spool, the belt being coupled to the spool, the belt winding and alternatively unwinding around the spool.

4. The bus occupancy check safety apparatus kit of claim 1 further comprising a belt sheath coupled to the rear mount, the belt sheath being coupled around the belt aperture and extending upwards around the belt, the belt sheath having a length, wherein the length is configured to be less than a height of the plurality of seats.

5. The bus occupancy check safety apparatus kit of claim 1 further comprising a handle coupled to the belt, the handle being coupled proximal the front end.

6. The bus occupancy check safety apparatus kit of claim 1 further comprising each of the rear mount and the front mount having a triangular lateral side, a triangular medial side, an angled front side, and an angled rear side.

7. The bus occupancy check safety apparatus kit of claim 1 further comprising a hang string coupled to the sign, the sign having a left edge, a right edge, a lower edge, and an upper edge, the hang string being coupled to the upper edge adjacent the left edge and extending around the pull nub to the upper edge adjacent the right edge.

8. The bus occupancy check safety apparatus kit of claim 1 further comprising the male buckle comprising a buckle head and a tongue, the buckle head being coupled to the front end of the belt and the tongue being coupled to the buckle head, the tongue having a first lock aperture.

9. The bus occupancy check safety apparatus kit of claim 8 further comprising the female buckle comprising a buckle body having a leading face and an adjacent upper face, the leading face having a receiver channel and the upper face having a second lock aperture extending through the receiver channel, the receiver channel selectively receiving the tongue of the male buckle, the first lock aperture and the second lock aperture being aligned when the male buckle and the female buckle are engaged.

10. The bus occupancy check safety apparatus kit of claim 4 further comprising a buckle extension coupled to the upper side of the front mount, the female buckle being coupled to the buckle extension.

11. A bus occupancy check safety apparatus kit comprising:
a seat occupancy cover belt system comprising:
a rear mount having a bottom side, a top side, a first triangular lateral side, a first triangular medial side, a first angled front side, a first angled rear side, and an internal cavity, the top side having a belt aperture extending through to the internal cavity, the bottom side being configured to be coupled to a rear of a bus or a van;

a retraction mechanism coupled to the rear mount, the retraction mechanism comprising a spool coupled within the inner cavity and a spring coupled within the spool;

a belt coupled to the retraction mechanism, the belt having a back end coupled to the spool and a front end extending through the belt aperture, the belt winding and alternatively unwinding around the spool;

a belt sheath coupled to the rear mount, the belt sheath being coupled around the belt aperture and extending upwards around the belt, the belt sheath having a length, wherein the length is configured to be less than a height of a plurality of seats of the bus or the van;

a handle coupled to the belt, the handle being coupled proximal the front end of the belt;

a male buckle coupled to the belt, the male buckle comprising a buckle head and a tongue, the buckle head being coupled to the front end of the belt and the tongue being coupled to the buckle head, the tongue having a first lock aperture;

a front mount having a lower side, an upper side, a second triangular lateral side, a second triangular medial side, a second angled front side, and a second angled rear side, the lower side being configured to be coupled to a front of the bus or the van;

a buckle extension coupled to the front mount, the buckle extension being coupled to the upper side; and a female buckle coupled to the buckle extension, the female buckle comprising a buckle body having a leading face and an adjacent upper face, the leading face having a receiver channel and the upper face having a second lock aperture extending through the receiver channel, the receiver channel selectively receiving the tongue of the male buckle, the first lock aperture and the second lock aperture being aligned when the male buckle and the female buckle are engaged;

wherein the belt is configured to be drawn across a seatback top of the plurality of seats within the bus or the van to engage the male buckle with the female buckle; and a seat occupancy window indicator comprising:
a suction cup having a window side and a back side, the suction cup being configured to be selectively engageable with a windshield of the bus or the van;

a pull nub disposed on the suction cup, the pull nub being centrally disposed on the back side of the suction cup; and a sign coupled to the pull nub, the sign having a left edge, a right edge, a lower edge, an upper edge, a hang string, and a lettered side, the hang string being coupled to the upper edge adjacent the left edge and extending around the pull nub to the upper edge adjacent the right edge, the lettered side displaying a message through the windshield.

\* \* \* \* \*